United States Patent
Sousa et al.

(10) Patent No.: US 7,549,004 B1
(45) Date of Patent: Jun. 16, 2009

(54) SPLIT FILTERING IN MULTILAYER SYSTEMS

(75) Inventors: Fabio P Sousa, High Wycombe (GB); Andrew Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 476 days.

(21) Appl. No.: 10/923,272

(22) Filed: Aug. 20, 2004

(51) Int. Cl.
*G06F 13/00* (2006.01)
*G06F 13/14* (2006.01)
*G06F 3/00* (2006.01)

(52) U.S. Cl. ............ 710/110; 710/39; 710/244
(58) Field of Classification Search ........... 710/110, 710/244, 39
See application file for complete search history.

(56) References Cited

U.S. PATENT DOCUMENTS

| | | | |
|---|---|---|---|
| 5,594,882 A * | 1/1997 | Bell ............................ 711/212 |
| 5,761,444 A * | 6/1998 | Ajanovic et al. ............. 710/100 |
| 5,805,837 A * | 9/1998 | Hoover et al. ............... 710/110 |
| 5,870,567 A * | 2/1999 | Hausauer et al. ............ 710/310 |
| 6,085,271 A * | 7/2000 | Smith et al. ................. 710/113 |
| 6,138,192 A | 10/2000 | Hausauer .................... 710/100 |
| 6,647,454 B1* | 11/2003 | Solomon ..................... 710/310 |
| 6,681,283 B1* | 1/2004 | Thekkath et al. ............ 710/305 |
| 6,697,906 B1* | 2/2004 | Ayukawa et al. ............ 710/316 |
| 6,857,035 B1* | 2/2005 | Pritchard et al. ............ 710/110 |
| 6,948,019 B2* | 9/2005 | Stuber et al. ................ 710/240 |
| 6,971,033 B2* | 11/2005 | Ma ............................ 713/300 |
| 6,993,620 B2* | 1/2006 | Ferguson .................... 710/313 |
| 7,043,593 B1* | 5/2006 | Tischler et al. ............. 710/311 |
| 7,054,971 B2* | 5/2006 | Beaudoin et al. ........... 710/244 |
| 7,174,401 B2* | 2/2007 | Stuber et al. ................ 710/110 |
| 2003/0046473 A1* | 3/2003 | Dobson et al. .............. 710/306 |
| 2004/0221075 A1* | 11/2004 | Dobson et al. ................ 710/39 |
| 2004/0225781 A1* | 11/2004 | Kotlowski et al. .......... 710/200 |
| 2004/0268010 A1* | 12/2004 | Garney et al. ............... 710/310 |
| 2005/0041685 A1* | 2/2005 | Logvinov et al. ........... 370/466 |

* cited by examiner

*Primary Examiner*—Khanh Dang
*Assistant Examiner*—Christopher A Daley
(74) *Attorney, Agent, or Firm*—Ropes & Gray LLP; Robert R. Jackson (57) ABSTRACT

Circuitry and methods enable masters without split capability to communicate with split capable slaves in a multilayer system. The output stage associated with each split capable slave, which usually comprises an arbiter, is augmented with a split filter. This split filter designates a channel on behalf of the master without split capability, filters the split and unsplit responses from the slave, and issues a second read request on behalf of the same master. Consequently, both the master without split capability and the split capable slave do not perceive any difference between this transaction and a normal one. The split filter implementation requires, at most, little change to the master and slave devices of the system.

22 Claims, 5 Drawing Sheets

SPLIT FILTERING IN MULTILAYER SYSTEMS

BACKGROUND OF THE INVENTION

Computer systems rely on efficient communication to transfer data, instructions, and status signals between devices. The multilayer bus, such as the Multilayer AHB® available from ARM of Cambridge, England, is a well-known communication medium. It forms a matrix of connections between its input ports, which are attached to masters, and its output ports, which are attached to slaves. The connection matrix allows any given master to access any slave.

A common optimization in multilayer systems is to introduce a split capability in some, if not all, of the connected devices. In order for the split capability to be beneficial, both the master and the slave in a given transaction must be split capable. Assuming this is the case, an illustrative split transaction proceeds as follows.

Suppose a master needs to read data from a peripheral slave. A master may be a microprocessor, controller, state machine, or any appropriate circuitry. The master will issue a read request to the slave, using the bus matrix described above. The slave will receive this request and, assuming the data is not yet ready for transmission, will issue a split response to the master. When the master receives the split response, it will release the slave bus. At this point, both the master and the slave are temporarily freed from the transaction. The master can perform other tasks while waiting for the data, and the slave can communicate with other masters. When the slave is finally ready to transmit the requested data, it will send an unsplit signal to the master, which will in turn issue a second read transaction and retrieve the desired data.

The split optimization described above is especially beneficial when slaves typically produce data with high latency. Without the use of splits, the slave bus would be tied up while the slave retrieves and prepares the data. This holding of the slave bus reduces the efficiency of the devices involved, as well as system efficiency as a whole.

However, a problem arises when a master without split capability tries to communicate with a split capable slave. When this occurs, the slave will issue a split response to the master, but the master will not understand the response. As a result, the master may keep retrying the same read request, or it may simply hang. In either case, both the master and the slave are rendered inactive until the transaction is aborted.

One obvious solution to this problem would be to make all masters split capable. Since split capable masters are able to interact with both split capable slaves and slaves without split capability, all masters would then be able to communicate with all slaves. Unfortunately, there are at least two problems with this solution. First, some masters must wait for the requested data to arrive from the slave before performing other tasks. Making such masters split capable would only add a 3-cycle overhead for each read transaction (one cycle for the split response, one for the unsplit signal, and one for the subsequent read request), thereby reducing its performance with split capable slaves. Second, it is not always possible to make a master split capable. For instance, the master may be an off-the-shelf processor that cannot be modified to accommodate splits.

In view of the foregoing, it would be desirable to find a way for masters without split capability to communicate with split capable slaves. Ideally, the solution would involve little change to the masters and slaves themselves.

SUMMARY OF THE INVENTION

In accordance with this invention, circuitry and methods are provided to permit masters without split capability to communicate with split capable slaves. An exemplary embodiment of the invention comprises a filter for each split capable slave. The filter works with the slave's arbiter to facilitate communication with masters, acting essentially as an intermediary.

When a master without split capability tries to access a split capable slave, it will communicate a read request to the slave's split filter. The filter will then forward the master's request to the slave, which responds by issuing a split response. This response will be received by the filter, but not forwarded to the master. The filter will indicate to the master that the data is not ready yet.

When the slave is finally ready to transmit the data, the filter will receive the slave's unsplit signal and respond by issuing a read request on behalf of the master. The slave then sends the requested data to the master, along with a signal indicating that the data is ready.

In this way, the master is able to perform the read transaction as if it were communicating with a normal slave, and the slave acts as if it were dealing with a split capable master. This transparency results in minimal changes to the master and slave devices themselves, making the invention easy to incorporate into existing systems.

The invention therefore advantageously permits interaction between masters without split capability and split capable slaves. Furthermore, the invention mainly involves changes to the multilayer bus, leaving the masters and slaves essentially unaltered.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
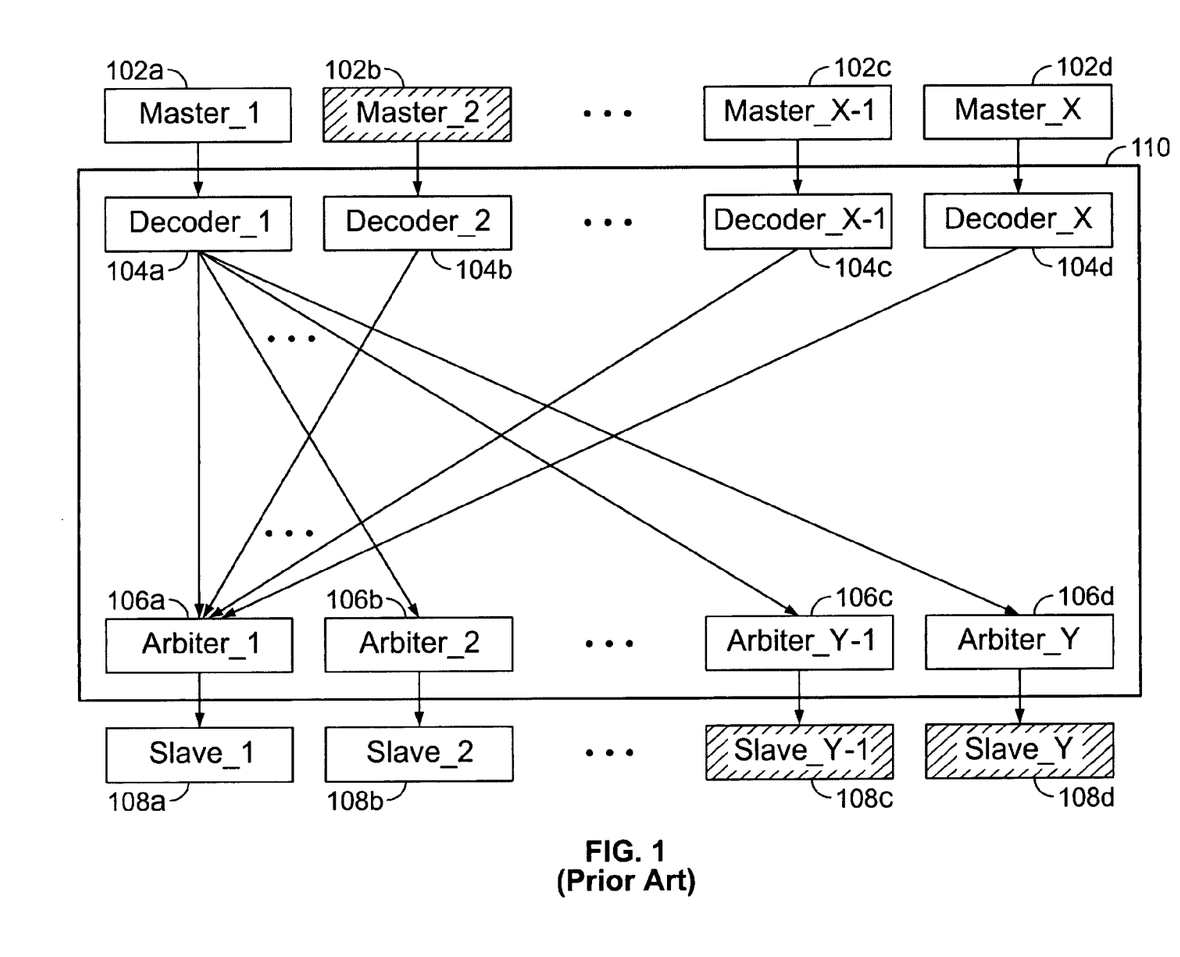
FIG. 1 is a diagram of a multilayer bus connecting master devices and slave devices.

FIG. 1 shows master devices 102a,b,c,d connected to slave devices 108a,b,c,d via bus 110. Note that although only four masters and four slaves are depicted, there can actually be an arbitrary number of masters and slaves. These numbers will be referred to as X and Y, respectively, in the following description. Split capable devices are indicated by gray shading, as in master 102b and slaves 108c,d.

Each master has a corresponding decoder 104, which determines which slave to contact for a given transaction. Similarly, each slave has a corresponding arbiter 106, which resolves conflicts arising from multiple masters requesting the same slave in a given time period. The arbiters in FIG. 1 do not include split filter functionality in accordance with the invention. Thus, if master 102a tried to communicate with split capable slave 108c, the bus of slave 108c would probably hang.

In this multilayer bus, each master can communicate with every slave, and by extension, each slave can communicate with every master. Only the connections from master 102a and the connections to slave 108a are shown. The other connections are omitted for clarity. In addition, note that although one line is drawn between a given master and slave, the actual connection between a pair of devices usually comprises many wires, as illustrated in FIG. 2.

Figure 2:
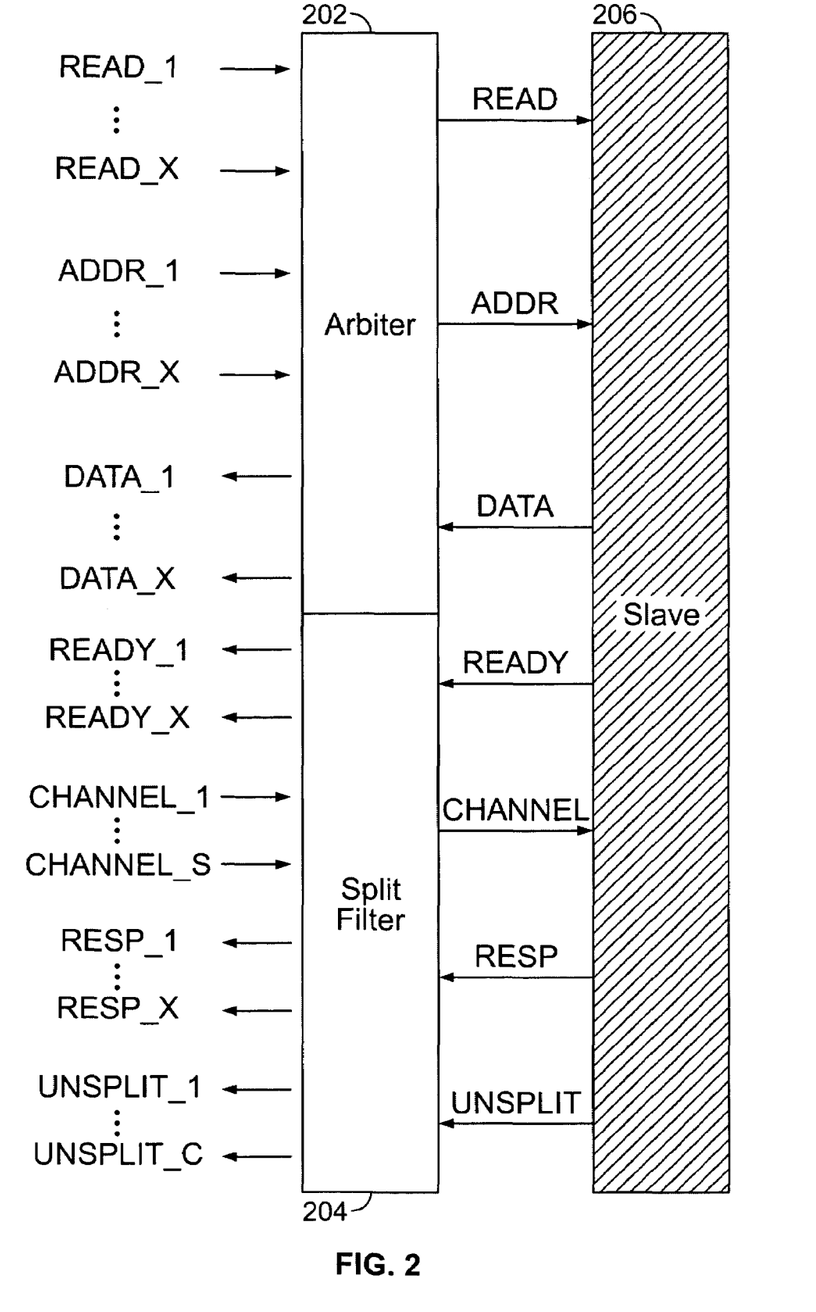
FIG. 2 is a diagram of an output stage in accordance with the invention.

FIG. 2 shows an exemplary embodiment of the invention. It shows a combination output stage, comprising arbiter 202 and split filter 204. This output stage is responsible for communicating with split capable slave 206. Although the signals are shown as passing through either arbiter 202 or split filter 204, in practice there would probably be signals passing through both modules. Also, it is implied that arbiter 202 and split filter 204 are capable of communicating with one another.

Signals READ_1 through READ_X come from the X masters connected to the bus. When a master wishes to retrieve data from slave 206, it will activate its corresponding READ_ signal. Arbiter 202 will receive the read requests and, if necessary, choose one master according to an arbitration scheme such as round robin. The read request will then be sent to slave 206, using signal READ.

Similarly, signals ADDR_1 through ADDR_X are received from each of the X master devices. They convey to the slave which address they are trying to read from. After deciding which requesting master is allowed to access slave 206, the arbiter will convey that master's ADDR_signal to the slave using signal ADDR. When the slave is ready to return the requested data (possibly after a split and subsequent unsplit have been performed), the data will be sent to arbiter 202 by way of signal DATA. Arbiter 202 will pass DATA onto the appropriate bus from among DATA_1 to DATA_X, so that the master that originated the read request will receive the desired data.

Now, consider the signals passing through split filter 204. The RESP signal coming from slave 206 is a multi-bit signal produced in response to a read request. For instance, RESP can encode an ERROR state, an OK state, or a SPLIT response. Split filter 204 communicates the RESP signal to the requesting master via signals RESP_1 to RESP_X.

The READY signal coming from slave 206 becomes positive (e.g., logical 1) when the slave is transmitting a valid response, such as a split, unsplit, or transmission of data. Split filter 204 passes this signal to the appropriate wire from among READY_1 to READY_X when the data is ready for transmission. Also, if the slave is interacting with a master without split capability and the slave transmits a SPLIT response, split filter 204 will keep the appropriate READY_signal negative until the data is ready. This functionality will be illustrated in more detail in FIG. 3.

The CHANNEL and UNSPLIT signals rely on the concept of channel communication, which will be described briefly here. A multilayer bus supporting split functionality often has a number of dedicated channels for transferring information. For purposes of illustration, suppose a bus has 16 channels. Only split capable masters and split capable slaves can make use of these channels. Each channel is assigned to a split capable master, probably during the design phase of the multilayer bus. For example, given 16 channels and 2 split capable masters, each master might be assigned 8 channels. In this case, each split capable master could issue up to 8 read requests before the data for the first read request is ready to be retrieved. Other assignments can be used, for instance allocating 12 channels to one master and 4 to the other. Each split capable master has a signal that is used to indicate which channel it is using for a given transaction. Assuming there are, in general, S split capable masters, these per-master signals are designated as CHANNEL_1 to CHANNEL_S in the diagram. Thus, if the first split capable master wished to use channel 4, then the signal CHANNEL_1 would have a value of 4. Split filter 204 sends the appropriate CHANNEL value to slave 206, so the slave will know which channel to use for the transaction.

Once the channel to be used is determined, the UNSPLIT signal is used by the slave to communicate the status of its data production. UNSPLIT is activated shortly after requested data is ready for transmission. Assuming C channels in the multilayer bus, this indicator is communicated to the requesting master via the chosen channel, using signals UNSPLIT_1 through UNSPLIT_C.

Figure 3:
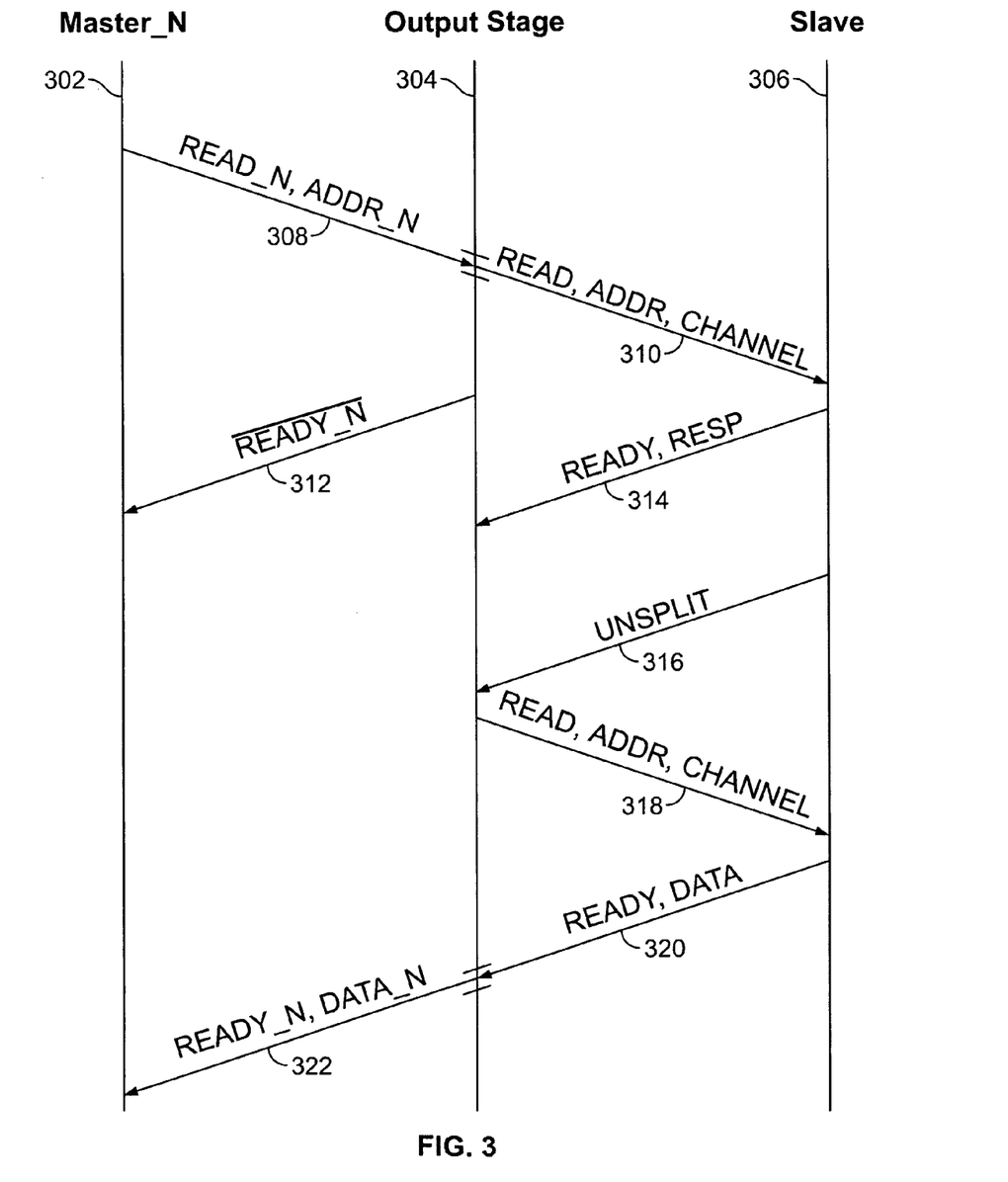
FIG. 3 is a diagram illustrating the operation of the output stage of FIG. 2 in accordance with the invention.

FIG. 3 shows the steps involved in an illustrative read transaction between a master without split capability and a split capable slave. Vertical line 302 represents the Nth master, which is not split capable. Line 304 represents the combined output stage, comprising an arbiter and a split filter as illustrated in FIG. 2, for the slave represented by line 306. Line 306 corresponds to a split capable slave. Time proceeds downward in FIG. 3, and each step in the transaction is represented by a downward-tilting arrow, pointing from the originating device to the receiving device. The arrow is labeled with the signals relevant to that step.

In a preferred embodiment of the invention, consecutive steps may either be separated by at least one clock cycle or occur within the same clock cycle. When the steps are separated by at least one clock cycle, there is a visible gap between the corresponding arrows in FIG. 3. If the steps occur within the same clock cycle, the corresponding arrows are marked by a pair of parallel lines through line 304.

At step 308, the Nth master activates READ_N and places the appropriate read address on ADDR_N for this particular slave. The output stage passes on this information using the READ and ADDR signals in step 310, without having to wait for the next clock cycle. Since the split capable slave expects a channel to be designated for this transaction, the split filter chooses a channel on behalf of the master. This channel should be chosen to avoid conflicts with other masters, specifically the split capable ones. For the sake of simplicity, assume that one specific channel, such as channel 0, has been designated especially for use by masters without split capability. Thus, step 310 would send a CHANNEL value of 0 to the slave. In addition to communicating the read request to the slave, the output stage also issues a negative READY_N signal to the master in step 312, indicating that the requested data is not ready yet.

Upon receiving the read request, the slave determines that the data is not ready yet. It will issue a SPLIT response using signal RESP, along with a positive READY signal to indicate that a valid response is being transmitted, at step 314.

When the slave is finally prepared to transmit the data, it issues an UNSPLIT signal at step 316. This signal is received by the output stage's split filter, which will issue a read request at step 318 that is essentially identical to the request of step 310. In one embodiment of the invention, the original request of step 310 is stored in memory for retransmission at step 318. By issuing the request of step 318, the split filter is effectively behaving as a split capable master, and interacts with the split capable slave on behalf of the actual master.

Once the read request of step 318 has been received, the slave transmits a positive READY signal to the output stage along with signal DATA containing the requested data. At this point, the slave bus has been made visible to the master, so the READY and DATA signals are passed directly to the master in step 322 via signals READY_N and DATA_N. After the master receives the requested data, the transaction is completed.

The split filter functionality as described above allows masters without split capability to access split capable slaves. In addition, split capable masters can still access slaves with and without split capability, functioning essentially as they did before. The only difference is that split capable masters can no longer use the channel that has been allocated for use by masters without split capability (e.g., channel 0 in the example above). Therefore, integration of the invention into existing systems only requires significant modifications to the slave output stages.

Figure 4:
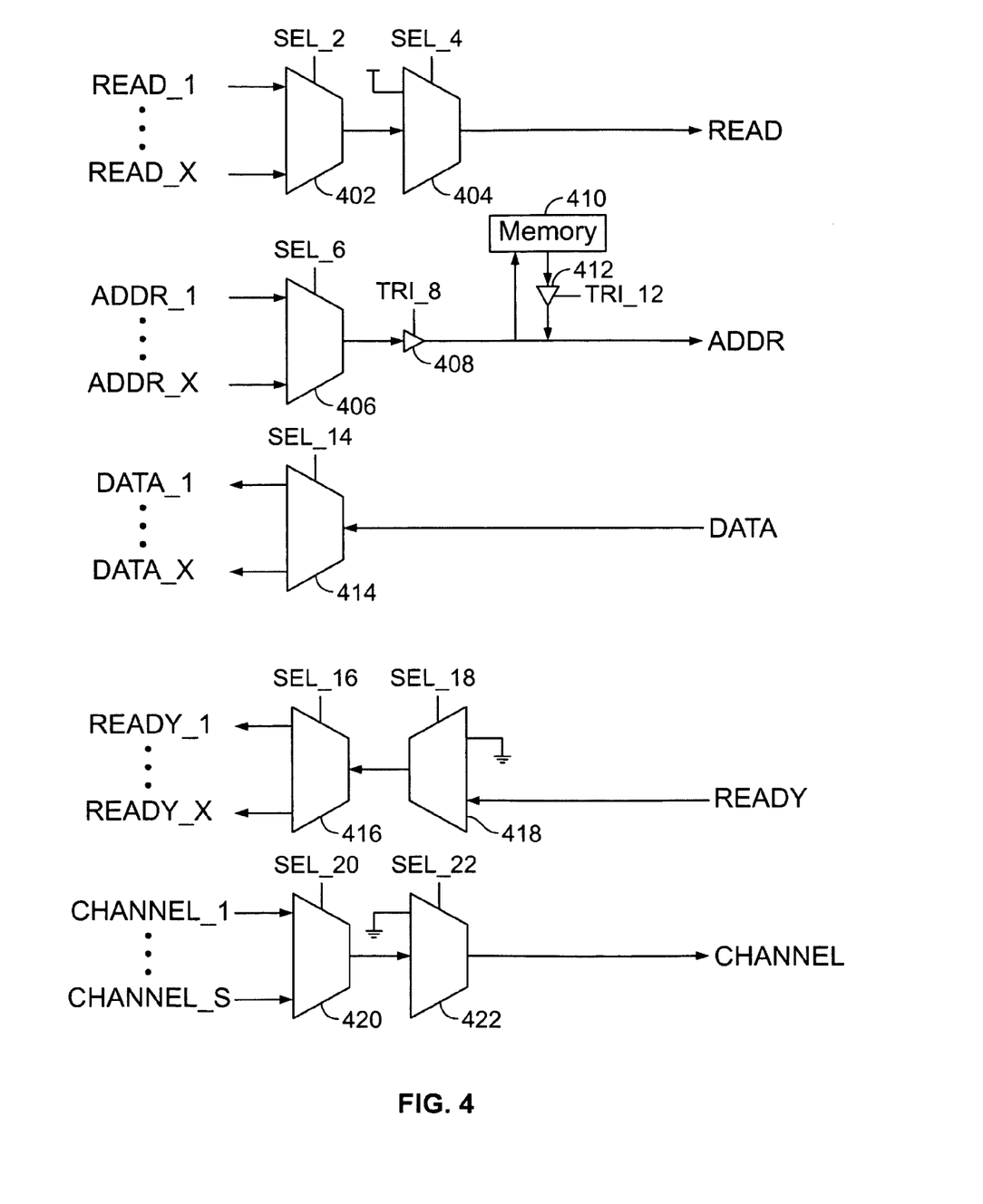
FIG. 4 is a diagram illustrating circuitry that may be included in the output stage of FIG. 2 in accordance with the invention.

FIG. 4 shows circuitry that may be included in the output stage of FIG. 2. Multiplexer 402 receives signals READ_1 through READ_X, passing a value from among those signals to multiplexer 404. If the output stage is forwarding an initial read request, as in step 310 of FIG. 3, multiplexer 404 can simply pass the output of multiplexer 402 to signal READ. However, if the output stage is generating a read request in response to receiving an unsplit signal, as in step 316 of FIG. 3, multiplexer 404 can simply assert a positive value on signal READ by choosing the input that is always tied positive. This may be necessary, for example, if a master only activates the appropriate READ_signal for one cycle at the start of the transaction.

Multiplexer 406 receives signals ADDR_1 through ADDR_X, passing a value from among those signals to tri-state buffer 408. If the output stage is forwarding an initial read request, as in step 310 of FIG. 3, tri-state buffer 408 will pass its input to signal ADDR. In this case, the value of signal ADDR is stored in memory 410 for future use. Memory 410 can comprise registers, random-access memory ("RAM"), first-in-first-out ("FIFO") memories, or the like. When the output stage needs to generate a read request in response to an UNSPLIT signal, as in step 318 of FIG. 3, it will read the appropriate address from memory 410, and assert it on signal ADDR using tri-state buffer 412. In this way, the output stage is able to store the information contained in the original read request, and reissue that request when needed.

Data being transmitted from a slave to a master passes through demultiplexer 414. Demultiplexer 414 connects signal DATA to the appropriate bus from among DATA_1 through DATA_X for transfer to the corresponding master.

Demultiplexer 416 communicates the status of a slave's response to the requesting master. If the output stage is sending a READY_signal in response to an initial read request, as in step 312 of FIG. 3, the READY_signal transmitted must have a negative value. This negative value can be obtained by having multiplexer 418 pass its negatively tied input to multiplexer 416. However, if the output stage is communicating a positive READY_signal at the end of a transaction, as in step 322 of FIG. 3, then multiplexer 418 can choose signal READY as input.

Multiplexer 420 receives signals CHANNEL_1 through CHANNEL_S, passing a value from among those signals to multiplexer 422. If the output stage is facilitating communication between a split capable master and a split capable slave, then multiplexer 422 simply has to pass the output of multiplexer 420 to signal CHANNEL. This enables the split capable slave to use the specified channel for communication. However, if the communication is occurring between a master without split capability and a split capable slave, as in FIG. 3, then multiplexer 422 has to place a pre-selected value on signal CHANNEL. This value must specify a channel that no split capable masters are using, as described in connection with FIG. 3. In the preferred embodiment, this pre-selected CHANNEL value is 0. In accordance with this embodiment, multiplexer 422 can choose the input tied negative when facilitating communication between a master without split capability and a split capable slave.

The circuitry shown in FIG. 4 allows steps 310 and 322 of FIG. 3 to occur in the same clock cycle as the corresponding trigger step (for example, step 308 or 320). As shown, the signals in steps 310 and 322 are generated with combinational logic, and need not pass through any registers. Multiplexer and demultiplexer control signals SEL_2 through SEL_22, as well as tri-state buffer control signals TRI_8 and TRI_12, are set by the logic of the output stage in accordance with the invention.

Note that the embodiments of the invention shown in FIG. 2, FIG. 3, and FIG. 4 are merely illustrative. For example, in practice the masters could have the ability to write to slaves, not just read from them. In that case, there would be additional WRITE signals and the DATA signals would be bi-directional. There are also other signals that could serve to control or otherwise communicate with the output stage and the slave. All of these possible signals were omitted from the figures herein for simplicity of illustration. In addition, status signals such as READY could be active low or active high, meaning that a "positive" value, as used in the preceding text, could be indicated by a logical 1 or a logical 0.

The use of communication channels could likewise have been different. For example, channel identification could be done on a per-master basis. In this scenario, if the CHANNEL signal passed from the split filter to the slave contained a value of 4, that would entail using channel 4 of that split capable master, not channel 4 of the entire multilayer bus. A more extreme variation would be to allocate channels to split capable masters at runtime instead of at design time, by using a global channel arbiter. That would permit the use of more split capable masters than channels. Other variations exist, but they do not change the underlying concept of the invention.

Although the invention has been described herein as applied to the AHB® Bus available from ARM of Cambridge, England, any suitable multilayer bus could be used. Furthermore, the multilayer bus could be implemented on a wide variety of integrated circuits, such as programmable logic devices (PLDs), application-specific integrated circuits (ASICs), or hybrids of the two. Examples of PLDs include field programmable gate arrays (FPGAs), complex programmable logic devices (CPLDs), and programmable array logic (PALs).

Figure 5:
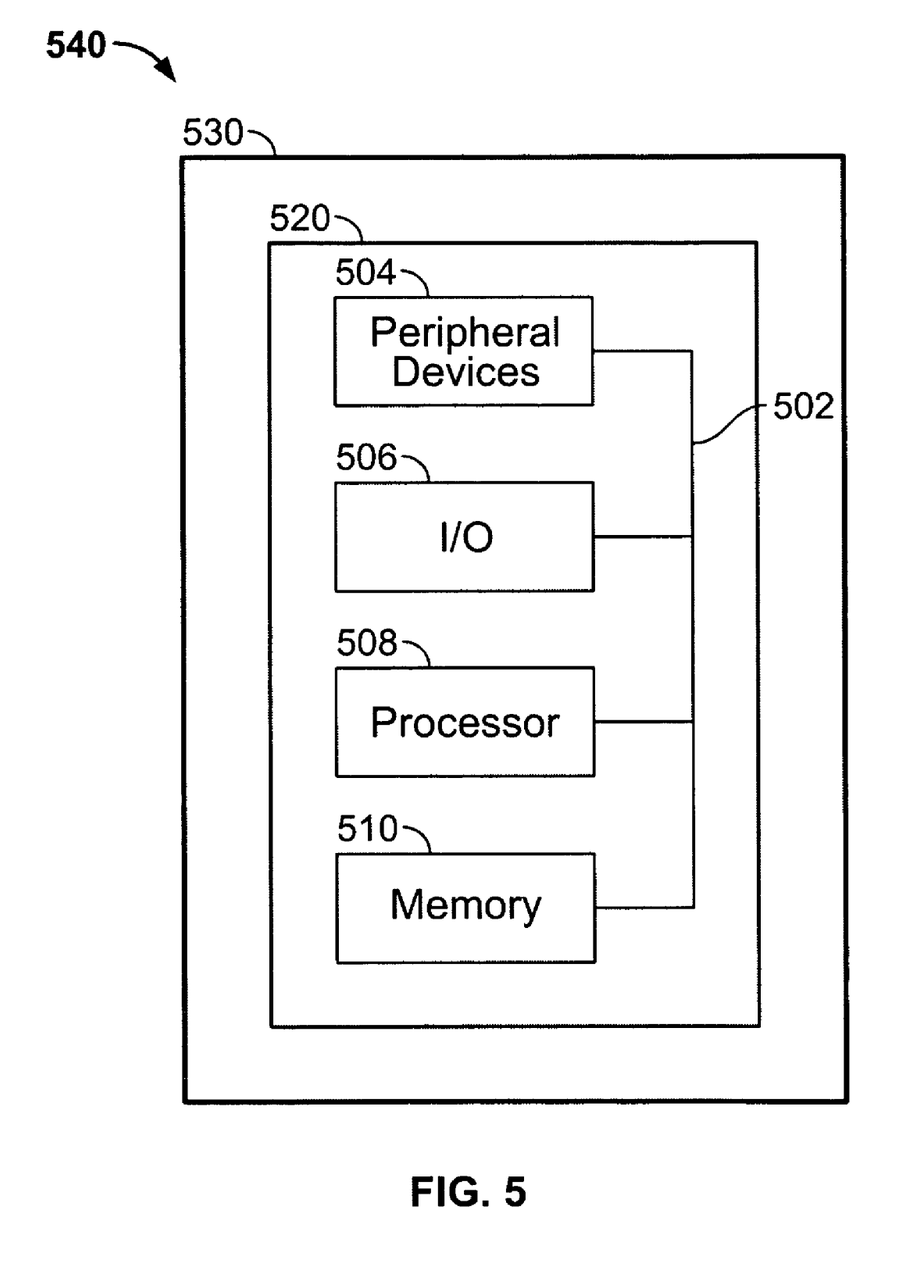
FIG. 5 is a block diagram of a system incorporating the invention.

FIG. 5 illustrates a multilayer bus 502 incorporating the invention in a data processing system 540. Data processing system 540 may include one or more of the following components: peripheral devices 504; I/O circuitry 506; a processor 508; and memory 510. These components are populated on a circuit board 520 which is contained in an end-user system 530.

System 540 can be used in a wide variety of applications, such as computer networking, data networking, instrumentation, video processing, and digital signal processing. It should be noted that system 540 is only exemplary, and that the true scope and spirit of the invention should be indicated by the following claims.

Thus it is seen that circuits and methods are provided for allowing masters without split capability to communicate with split capable slaves. One skilled in the art will appreciate that the invention can be practiced by other than the described embodiments, which are presented for purposes of illustration and not of limitation, and the present invention is limited only by the claims which follow.

We claim:

1. A method of communication between a master device and a slave device with the aid of output stage circuitry that conveys signals between the master device and the slave device, comprising:
    issuing a first request from the master device to the slave device;
    receiving with the output stage circuitry a split response from the slave device in response to the first request;
    receiving with the output stage circuitry an unsplit response from the slave device;
    issuing a second request to the slave device from the output stage circuitry in response to receiving the unsplit response from the slave device; and
    fulfilling the first request from the slave device in response to the second request, wherein:
    the master device is not capable of performing split transactions; and
    the slave device is capable of performing split transactions.

2. The method of claim 1, wherein issuing a first request comprises:
    specifying a channel that cannot be used by master devices capable of performing split transactions.

3. The method of claim 1, wherein the first request from the master device to the slave device is a read request.

4. The method of claim 3, further comprising:
    signaling to the master device from the output stage circuitry that the first request cannot be fulfilled in response to receiving the first request.

5. The method of claim 1, wherein the fulfilling comprises:
    signaling to the master that the first request can be fulfilled.

6. A split filter circuit associated with a slave device, comprising:
    means for communicating a first request from a master device to the slave device;
    means for receiving a split response from the slave device;
    means for receiving an unsplit response from the slave device;
    means for communicating a second request to the slave device in response to receiving the unsplit response from the slave device; and
    means for communicating a fulfillment of the first request from the slave device to the master device in response to the second request, wherein:
    the master device is not capable of performing split transactions; and
    the slave device is capable of performing split transactions.

7. An output stage circuit associated with a slave device, comprising:
    an arbiter circuit for handling requests from master devices; and
    the split filter circuit of claim 6.

8. A communication bus, comprising:
    at least one output stage circuit as described in claim 7, associated with at least one slave device; and
    at least one address decoder, associated with at least one master device, wherein:
    each of the at least one address decoder is connected to each of the at least one output stage.

9. The communication bus of claim 8, wherein:
    the at least one master device comprises at least one processor; and
    the at least one slave device comprises at least one peripheral device.

10. A printed circuit board, comprising:
    at least one processor not capable of performing split transactions;
    at least one peripheral device capable of performing split transactions; and
    the communication bus of claim 8, wherein:
    the communication bus is able to facilitate at least one complete transaction between the at least one processor and the at least one peripheral device through the communication bus; and
    the at least one transaction comprises a read request.

11. The printed circuit board of claim 10, further comprising:
    memory circuitry; and
    input/output circuitry.

12. An end user system, comprising the printed circuit board of claim 11.

13. A method of facilitating communication between split capable slave circuitry and master circuitry that is not split capable, the communication taking place at least in part via output stage circuitry, the method comprising:
    receiving with the output stage circuitry a request for communication from the master circuitry;
    storing the request in the output stage circuitry;
    applying the request from the output stage circuitry to the slave circuitry;
    communicating a not ready signal from the output stage circuitry to the master circuitry;
    receiving with the output stage circuitry a split signal from the slave circuitry;
    receiving with the output stage circuitry an unsplit signal from the slave circuitry;
    using results of the storing to re-apply the request by the output stage circuitry to the slave circuitry in response to the output stage circuitry receiving the unsplit signal from the slave circuitry; and
    applying a ready signal from the output stage circuitry to the master circuitry.

14. The method defined in claim 13, further comprising:
    communicating data between the master and slave circuitries.

15. The method defined in claim 13, wherein the request includes address information.

16. Apparatus for facilitating communication between split capable slave circuitry and master circuitry that does not have split capability, comprising:
    first circuitry that (1) receives from the master circuitry a request for communication between the master and slave circuitries, (2) stores the request, (3) forwards the request to the slave circuitry, and (4) communicates a not ready signal to the master circuitry;
    second circuitry that receives a split signal from the slave circuitry;
    third circuitry that receives an unsplit signal from the slave circuitry and again communicates the request stored by the first circuitry to the slave circuitry in response to receiving the unsplit signal from the slave circuitry; and
    fourth circuitry that communicates a ready signal to the master circuitry.

17. The apparatus defined in claim 16 further comprising:
    fifth circuitry that communicates data between the master and slave circuitries.

18. The apparatus defined in claim 16 wherein the request comprises address information.

19. The apparatus defined in claim 16 wherein at least some of the first through fourth circuitries reside in bus circuitry between the master and slave circuitries.

20. The apparatus defined in claim 16 wherein the first through fourth circuitries reside in bus circuitry between the master and slave circuitries.

21. A printed circuit board on which is mounted:
split capable slave circuitry;
master circuitry that does not have split capability; and
apparatus as defined in claim 16 for facilitating communication between the slave circuitry and the master circuitry.

22. A digital signal processing system comprising:
split capable slave circuitry;
master circuitry that does not have split capability; and
apparatus as defined in claim 16 for facilitating communication between the slave circuitry and the master circuitry.

* * * * *